United States Patent
Lefevre et al.

(10) Patent No.: US 10,202,075 B2
(45) Date of Patent: Feb. 12, 2019

(54) SUNROOF COMPRISING LIGHTING MEANS

(71) Applicant: AGC GLASS EUROPE, Louvain-la-Neuve (BE)

(72) Inventors: Hugues Lefevre, Wepion (BE); Sebastien Linthout, Archennes (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 292 days.

(21) Appl. No.: 14/409,235

(22) PCT Filed: Jun. 12, 2013

(86) PCT No.: PCT/EP2013/062106
§ 371 (c)(1),
(2) Date: Dec. 18, 2014

(87) PCT Pub. No.: WO2013/189794
PCT Pub. Date: Dec. 27, 2013

(65) Prior Publication Data
US 2015/0151675 A1  Jun. 4, 2015

(30) Foreign Application Priority Data

Jun. 19, 2012  (BE) .................................. 2012/0410

(51) Int. Cl.
*F21S 41/20* (2018.01)
*B60Q 3/76* (2017.01)
(Continued)

(52) U.S. Cl.
CPC ............... *B60Q 3/76* (2017.02); *B32B 17/10* (2013.01); *B32B 17/1011* (2013.01);
(Continued)

(58) Field of Classification Search
CPC ............ B32B 17/10; B32B 17/10036; B32B 17/1011; B32B 17/10137;
(Continued)

(56) References Cited

U.S. PATENT DOCUMENTS 6,270,236 B1 * 8/2001 Brussog ................ F21S 48/215
362/227
2009/0046355 A1 * 2/2009 Derda ..................... B32B 17/10
359/359
(Continued)

FOREIGN PATENT DOCUMENTS

DE  10 2007 037 891  2/2009
EP       1 437 215     7/2004
(Continued)

OTHER PUBLICATIONS

International Search Report dated Jul. 19, 2013 in PCT/EP13/062106 Filed Jun. 12, 2013.

*Primary Examiner* — Y M Lee
(74) *Attorney, Agent, or Firm* — Oblon, McClelland, Maier & Neustadt, L.L.P.

(57) ABSTRACT

The invention relates to a laminated glass sunroof for a motor vehicle, including a means for illuminating the passenger compartment, said means including a set of light-emitting diodes incorporated between the glass sheets, in the insert material of the laminate, said sunroof having a maximum light transmission (LT) factor of at most 50%, the number and power of the diodes being selected in order to ensure useful lighting without causing detrimental overheating for the components of the glass panel.

22 Claims, 5 Drawing Sheets

(51) Int. Cl.
  *B32B 17/10* (2006.01)
  *B60Q 3/74* (2017.01)
  *B60Q 3/51* (2017.01)
  *B60Q 3/208* (2017.01)
  *B60Q 3/80* (2017.01)

(52) U.S. Cl.
  CPC .. *B32B 17/10036* (2013.01); *B32B 17/10137* (2013.01); *B32B 17/10201* (2013.01); *B32B 17/10229* (2013.01); *B32B 17/10293* (2013.01); *B32B 17/10541* (2013.01); *B32B 17/10761* (2013.01); *B60Q 3/208* (2017.02); *B60Q 3/51* (2017.02); *B60Q 3/74* (2017.02); *B60Q 3/745* (2017.02); *B60Q 3/80* (2017.02)

(58) Field of Classification Search
  CPC ........ B32B 17/10201; B32B 17/10229; B32B 17/10293; B32B 17/10541; B32B 17/10761; B60Q 3/0213; B60Q 3/0279; B60Q 3/0203; B60Q 3/0283; B60Q 3/0286; B60Q 3/0293; B60Q 3/76; B60Q 3/208; B60Q 3/51; B60Q 3/80; B60Q 3/745; B60Q 3/74
  See application file for complete search history.

(56) References Cited

U.S. PATENT DOCUMENTS

| | | | |
|---|---|---|---|
| 2009/0114928 A1 | 5/2009 | Messere et al. | |
| 2009/0174300 A1 | 7/2009 | Jousse et al. | |
| 2010/0051088 A1* | 3/2010 | Levin | H01L 31/0521 136/246 |

FOREIGN PATENT DOCUMENTS

| | | |
|---|---|---|
| FR | 2 895 781 | 7/2007 |
| WO | 2007 045786 | 4/2007 |
| WO | 2007 071724 | 6/2007 |
| WO | 2007 085599 | 8/2007 |

\* cited by examiner

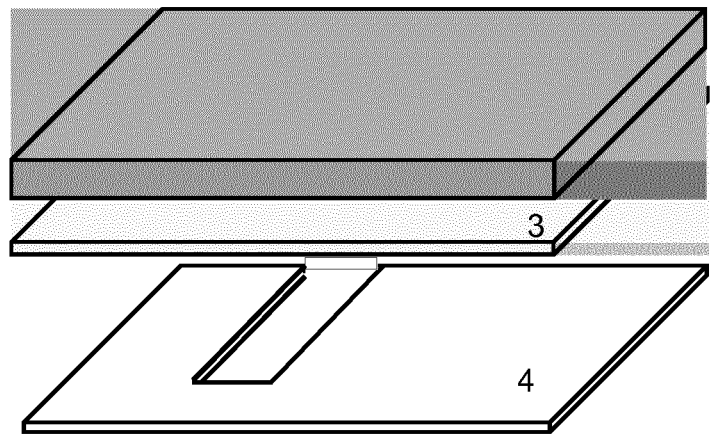
Fig.1
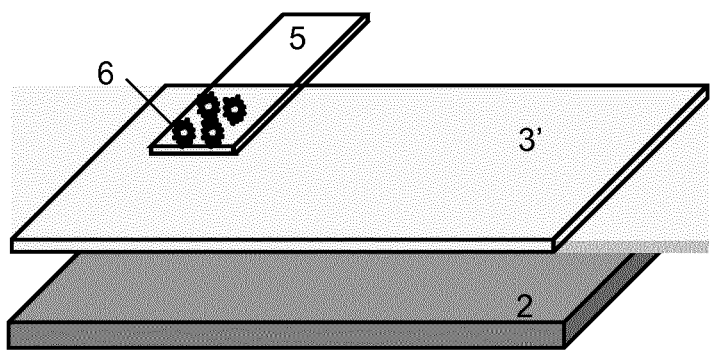
Fig.2
Fig.3
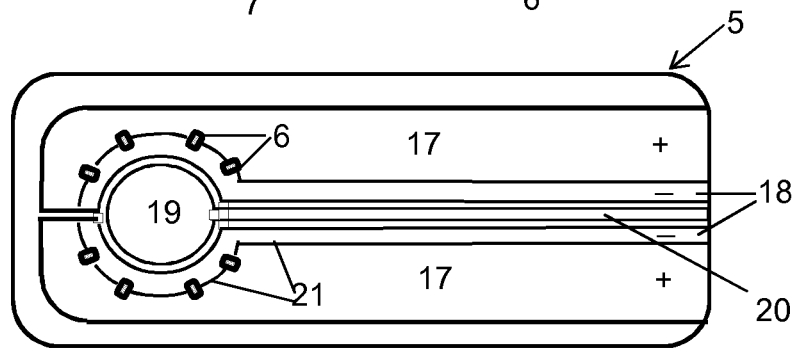

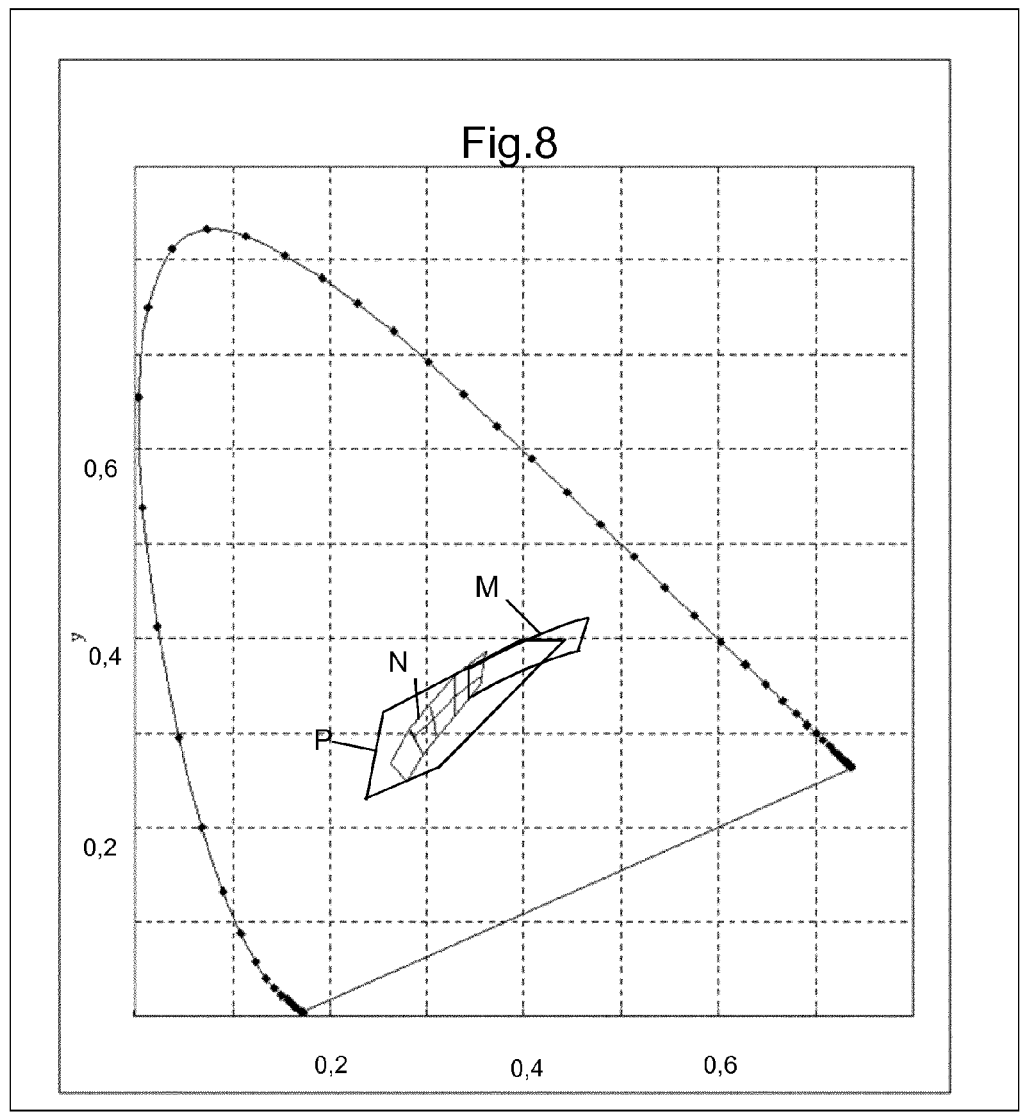

SUNROOF COMPRISING LIGHTING MEANS

The invention relates to vehicular roofs formed, at least in part, from a glazing unit. More precisely, the invention relates to roofs the glazing unit of which covers a large portion of their area or even all of the latter.

Glazed roofs are increasingly being substituted for traditional roofs that are part of the body of vehicles. The choice of these roofs is a result of manufacturers offering to their customers this option, which makes the vehicle seem like it opens onto the exterior, like a convertible, without the drawbacks of convertibles, these roofs maintaining the comfort levels of traditional sedans. To do so glazed roofs must meet many requirements. It is recommended to address safety requirements first. Glazed roofs must meet regulations that establish an ejection resistance in the case of an accident. Specifically, they must meet the rule known as "rule R43". Passenger ejection resistance especially necessitates the use of laminated glazing units.

The use of laminated glazing units does not obviate the need to limit weight. For this reason, the thickness of the laminated roofs used must also be kept down. In practice, the glazing units of these roofs are no larger than 8 mm and preferably no larger than 7.5 mm in thickness.

The aim of glazed roofs, as mentioned above, is to increase the brightness of the passenger compartment. This advantage must not be obtained at the expense of other properties that ensure comfort and in particular thermal comfort of passengers. The use of glazed roofs, motivated by the brightness increase, also increases heat exchange with the exterior. This is observed via a greenhouse-effect mechanism when the vehicle is exposed to intense solar radiation. However, the roof must also contribute to maintaining the temperature of the passenger compartment during cold periods.

Various measures are employed to control thermal conditions, including the use of high-selectivity glazing units. These conditions result from the choice of the glass used (most often mineral glass, but also possibly organic glass). Additional filters borne by the glazing units, especially filters consisting of systems of layers that selectively reflect infrared radiation, also have a bearing on these conditions. Solutions addressing these requirements are known from the prior art. This is the case in particular of patent EP 1 200 256.

The choice of glazed roofs has also allowed additional functionalities to be developed, for example integration of photovoltaic systems that contribute to the electrical production required to operate various vehicle systems. The implementation of such systems is the subject of many publications, and especially patent EP 1 171 294.

Moreover, it may be desired to increase passenger-compartment brightness only from time to time. The user may, depending on the moment of use, prefer a lower brightness, or simply want to maintain an aspect of "privacy" that prevents the passenger compartment from being looked into from the exterior.

Solutions allowing the light transmission of a glazing unit to be modified to suit the conditions of use have already been developed. It is in particular a question of what are referred to as "electrically controlled" glazing units, such glazing units comprising electrochromic means in which the variation is obtained by modifying the state of colored ions in compositions contained in these glazing units. It may also be a question of glazing units comprising layers of particles in suspension, which, contingent on the application of an electrical voltage, are ordered or not, such as the systems called SPDs (for suspended particle devices).

The development of glazed roofs raises other questions and opens the way to novel products. Certain functions may or must be modified on account of the specificities of these roofs.

Among these functions figures the lighting of the passenger compartment, whether it is a question of ambient lighting or more localized lighting corresponding to that qualified a "reading light". Conventionally, the means used to provide these different types of lighting are placed on the roof or on the interior trim of the latter. Frequently also the illuminating means form part of an assembly that extends in part onto the windshield, and that comprises the base of the interior rear-view mirror and various sensors that are used to control when the windscreen wipers and the headlamps turn on, this assembly also containing means for communicating data electromagnetically at various frequencies (remote toll payment, GPS, etc.), or driver aids such as infrared cameras. The assemblies in question obstruct, locally, the desired transparency that is the motivation for choosing these "glazed" solutions.

The invention proposes to optimize use of the glazing units forming these roofs by integrating therein means for lighting the passenger compartment of such design that the latter do not significantly degrade their transparency. This integration, as described below, makes it possible to take advantage of new arrangements tailored to these glazed roofs.

The mode chosen according to the invention is the use of light-emitting diodes (LEDs). This choice has been proposed before, for example in patent applications WO 2004/062908, EP 1 437 215 and EP 1 979 160. In these applications, the diodes are located in the plastic interlayer of the laminated glazing unit that joins the two glass sheets together. Depending on the application in question, the LEDs are either supplied with power by thin conductive wires (EP 1 979 160) or by transparent conductive layers (EP 1 437 215).

Apart from the principle of using LEDs as light sources, the prior art leaves unanswered questions relating to the specific technologies that will allow these products to meet the requirements of manufacturers, and whether/how these technologies will actually be integrable/integrated into the laminated structures in question. The inventors therefore propose solutions to these questions.

One requirement, associated with the operating mode in question, is that enough power be provided, especially if a reading light is to be formed.

It has already been envisioned to use LEDs to display information in luminous form. The display of information requires only a relatively low power, even when the display is located on a glazing unit exposed to light from outside the vehicle, or, in other words, even when the display is contre-jour. The light emitted by LEDs is concentrated on a very small area so that a high contrast is obtained to outside light even with a limited power. The same is not true for "lighting" applications. To a certain extent, a point source may even be disadvantageous. There is a risk of dazzle if these very bright point sources are looked at directly, this risk increasing as the delivered power increases.

The light transmission of glazed roofs is systematically limited, on the one hand in order to provide what may be qualified an aspect of "privacy", and on the other hand to limit the energy transfer that is indissociable from wavelengths in the visible domain. For these two reasons at least, the light transmission of glazed roofs is normally lower than 50% and often much lower, for example being about 15 to 20% or less of the incident light. The transmission in question may be adjusted in various ways as indicated below, especially using sheets that absorb some of the incident light, but also by means that allow transmission to be controllably varied.

It is necessary to take into account elements that attenuate the light emitted by the diodes, and in particular the fact that, depending on the glazing unit in question, a relatively large amount of light is absorbed in the sheets of glass, interlayers and any element placed on the path followed by the light flux emitted, when determining the luminous power required to provide a given level of illumination.

The luminous power required by the lighting according to the invention is advantageously apportioned between a plurality of diodes. Using a multiplicity of diodes has a number of advantages. A first advantage is, for example, that diodes of lower individual power may be used. Even though the power of commercially available diodes has considerably increased, those of moderate power remain advantageous, if only because they are less expensive. They are also advantageous insofar as the luminous efficacy of the most powerful diodes is not the best. It is therefore preferable to choose diodes from power ranges corresponding to the best efficacy. This way of proceeding also addresses the need, about which more is said below, to limit the negative consequences associated with the thermal conditions under which the diodes are used.

The energy conversion efficiency of diodes has also significantly improved over time. For a given power, the amount of heat generated by recent products has tended to decrease. Nonetheless, the best energy conversion efficiencies—i.e. the percentage of electrical power converted into light—generally does not exceed 30% and most commonly is about 15 to 20%. Therefore, a substantial amount of heat is generated by Joule heating.

The position of the diodes in the laminate does not make removal of the heat generated during operation easy. For a high operating power, a diode may cause local heating that may eventually degrade the diode itself, solder connections to the power supply circuit, or elements present in the laminated roof making contact or in immediate proximity to the diode. Although glass sheets may without damage withstand a temperature increase, other constituents, including the thermoplastic sheets that join the laminate together, need the temperature to be kept between relatively strict limits, most often lower than 100° C. and even often lower than 80° C. For this reason, it is preferable according to the invention to distribute the required total power over a plurality of diodes, each providing only a fraction of this total power, these diodes being arranged a distance from each other.

Experimentation allows the variation of the temperature of a diode of given power in an environment such as that corresponding to a laminated glazed roof to be evaluated. This evaluation takes account of the fact that, for a diode, heat is dissipated essentially by conduction through the materials making contact therewith. Thermoplastic interlayers made of materials such as PVB are not good conductors, neither are sheets of organic or mineral glass. Care must therefore be taken to restrict the power of the diodes used. Experimentation has shown that for the envisioned conditions of use and with the energy conversion efficiency of available diodes the electrical power must preferably not exceed 2 W, and most often must not exceed 1 W or even 0.5 W. If, as expected, progress is made toward better energy conversion efficiencies, or in other words smaller fractions of power are dissipated in the form of heat, power could then be increased without risk. Continued progress could lead to diodes having powers of up to 4 or even 5 W being used.

For a given electrical power, diode light flux may vary to a large extent. In order not to have to multiply needlessly the number of diodes required, and complicate their integration into the laminate, the power of the diodes used is no lower than 15 lm/W and preferably no lower than 40 lm/W and in a particularly preferable way no lower than 75 lm/W. In contrast, it is preferable not to increase excessively their power in order not to risk heating that is detrimental to their longevity and/or degradation of the constituents of the laminate. The individual power of the diodes advantageously remains lower than 100 lumens per electrical watt.

The luminous power required may vary substantially depending on the vehicle and use in question (reading light, ambient or courtesy lighting).

By way of indication, for a reading light the required illuminance is about 20 to 100 lux, namely a flux of light on the object illuminated, depending on the configuration of the passenger compartment of the vehicle, that is no lower than 1 lm, preferably no lower than 2 lm and that may be as high as 50 lm or more. For ambient lighting of the passenger compartment the luminous power is normally a bit lower. The illuminance is normally no lower than flux and may be as much as 10 lux or more. Under these conditions, the light flux for ambient lighting of the entirety of a passenger compartment may range from 2 to 60 lumens.

Another factor influencing illuminance is related to the orientation of the light flux. The most commonplace diodes emit into the entire space in front of the diode. To do this the diode comprises a reflective element that directs the flux to just one side. It will be noted that though the diodes may be equipped with optical means that concentrate and direct the emitted light flux, these means are ineffective when they are surrounded by a medium of similar refractive index. These lenses, which are made of synthetic materials such as epoxy resin, do not have enough of an index difference with the thermoplastics of the interlayers of the laminate, such as polyvinyl butyral. Therefore, additional means are advantageously used to control the direction of the beam. Example embodiments are presented below.

In practice, for reading light applications, the power of the diodes is chosen taking into account the absorption of the constituents of the glazing unit, such that the light intensity emitted from the glazing unit in a solid angle of 40° normal to the glazing unit by each diode is no lower than 10 cd and preferably no lower than 15 cd.

On account of the light flux emitted by the most appropriate available diodes, a reading light advantageously comprises from 2 to 20 diodes and preferably from 6 to 15. For more powerful diodes, just one of them could suffice, if it were efficient enough. For general lighting of a passenger compartment, the number of diodes depends on the size of the passenger compartment, it may be much higher than in the preceding case. Divided by the area of the roof, the number of diodes distributed over the roof may advantageously be about 6 to 40/m², and most often from 10 to 30/m².

Whether it is a question of a reading light or ambient lighting, it is preferable to keep the diodes a certain distance from each other in order to make it easier to dissipate the heat that they generate. A spacing of 10 mm at least between each diode is preferred, and advantageously of at least 20 mm.

As highlighted above, the light transmission of glazed roofs is necessarily limited. This absorption is conventionally obtained by way of the sheets of glass and interlayers used. This absorption may also be due to absorbent layers present on the sheets or to the use of devices allowing various transmission states to be selected, or even to a combination of a number of these means.

When the absorption is obtained by sheets of glass and interlayers, overall and/or individually, these elements are very absorbent. However, a high absorption of this type may also be advantageous in roofs comprising elements that allow transmission to be selected, in order to further decrease the transmission of light and energy and/or for example to control the color of the glazing unit.

In roofs that comprise means for controllably varying transmission, about which means more is said below, the absorption by the glass sheets, and optionally that of the interlayers, may be less. In their "clear" configuration, electrically controlled systems contribute to an absorption that normally does not exceed 50%. If the desired transmission in this state of the electrically controlled system is considered to be lacking, the sheets of glass and interlayers must significantly decrease transmission. The absorption in this case may still be very substantial. It is preferably at least 25% and may be as high as 40% or more. The absorption in question controls whether the device is in its clear or dark state. In the clear state the device contributes to decreasing the transmission of energy and light, and possibly participates in the masking of elements contained in the glazing unit.

The glass sheets used to form the laminate may have the same composition and possibly the same thickness, which may make them easier to shape beforehand, the two sheets being bent simultaneously for example. Most often the glass sheets have different compositions and/or thicknesses, and in this case they are preferably shaped separately.

The glass sheets are preferably chosen so that the transmitted light, just like the reflected light, is of as neutral as possible a color. Overall, the glazing unit has a gray or slightly bluish color.

The possible presence of colored interlayers participates in the absorption of light. The presence of these colored interlayers does not significantly decrease the transmission of energy. Their use may be envisioned in glazing units the glass sheets of which overall would not be absorbent enough. This situation may arise, for example, when, in order to integrate photovoltaic elements into the glazing unit, at least the external glass sheet is a sheet of poorly absorbent glass or even extra-clear glass. Excepting this particular case, most often the external sheet is also a sheet of absorbent glass, and there is no need for a colored interlayer.

The glass sheet turned toward the passenger compartment may also, exceptionally, be made of clear glass. It is most often absorbent and contributes to the overall decrease in energy transmission. When its transmission is limited, it allows non-transparent elements present in the glazing unit to be at least partially masked from the sight of passengers. This is for example the case of the diodes themselves when they are not activated, but it may also be a question of the aforementioned photovoltaic elements or of any element incorporated in the glazing unit.

Preferably, the two glass sheets are colored and the light emitted by the diodes is partially absorbed by the glass sheet turned toward the passenger compartment, and by the interlayer in which the diodes are inserted. In order not to decrease the light emitted by the diodes too much, the glass sheet turned toward the passenger compartment preferably absorbs no more than 40% and preferably no more than 30% of this light.

The color in transmission and reflection is also important in the choice of the sheets of glass and interlayers. For the glass sheet turned toward the passenger compartment, a glass that is particularly neutral in transmission is desirable because of the incidence it has on the color of the light flux produced by the diodes.

To form a reading light the light is preferably white or very slightly tinted. The (x, y) color coordinates in the CIE 1931 system, characterizing the lighting, taking into account, on the one hand, the emission of the diodes but also, on the other hand, the transmission of the interlayers and the glass sheet that is turned toward the passenger compartment, are such that they are advantageously inscribed in a perimeter defined by the points of coordinates: (0.2600; 0.3450), (0.4000; 0.4000), (0.4500; 0.4000), (0.3150; 0.2900), (0.2350; 0.2500), perimeter including both what is called cold light and warm light, and preferably in the perimeter defined by the points of coordinates (0.2650; 0.3350), (0.3200; 0.3200), (0.3100; 0.3000), (0.2350; 0.2500) which more precisely pertains to very slightly colored light.

As indicated above, the energy transmission of glazed roofs exposed to solar radiation is limited via a suitable choice of the constituent glasses thereof and also, if needs be, via use of thin films that selectively reflect infrared. The presence of glazed roofs may also lead to passengers experiencing a sensation qualified "cold shoulder", this sensation being caused by heat loss from the passenger compartment when the exterior temperature is lower than a comfortable room temperature.

In practice, to restore passenger comfort levels, manufacturers essentially use a screen that allows the interior surface of the glazing unit to be covered in its entirety. However, the presence of a screen, when it is closed, makes it impossible to benefit from the light(s) incorporated in the roof.

In order to make it possible not to have to use a screen, the invention provides roofs through which heat loss is minimized, without however excessively decreasing light transmission. In order to achieve this result, the invention proposes to apply low-E layers (low-emissivity layers) to that face of the glazing unit which is turned toward the passenger compartment. In keeping with the conventional nomenclature used to designate the faces of laminated glazing units, it is a question of position 4. The faces are numbered starting from the face exposed to the external atmosphere. The layers in question act as a filter that selectively reflects the infrared rays emitted by the passenger compartment, without forming a substantial obstacle to the transmission of rays in the visible domain from the exterior to the interior.

The advantage of these layers is that they never, under any circumstances, restrict the availability of the lighting functions according to the invention.

It is chosen to place the thin layers in position 4 despite the fact that in this position the layers are not protected from degradation, especially mechanical degradation. It is possible to choose low-E layers that are mechanically and chemically resistant enough.

The infrared filter function may be more or less "selective". The selectivity is defined as the ratio of the visible transmission (TL) to the solar factor (SF), the latter being the sum of the energy transmitted directly and of the energy absorbed then re-emitted into the interior, as defined in standard EN 410.

Advantageously, on account of how important it is to obtain coatings with a good mechanical resistance, what are called "hard" layers, such as those produced by PECVD, CVD or pyrolytic techniques, will be chosen. However, the low-E systems may also be produced using vacuum sputtering techniques, provided that the systems obtained are composed of layers that are sufficiently resistant.

According to the invention, it is preferable to use a system of low-E layers the emissivity of which is lower than 0.3 and preferably lower than 0.2 and in a particularly preferred way lower than 0.1.

Generally, regarding production of the roofs according to the invention, it is recommended to bear in mind the capacity of the constituent elements to withstand the processing used to shape and assemble the glazing unit. Starting with the basic elements: glass sheets, interlayers, power supply circuit of the diodes, the diodes themselves and the low-E layers, the processing necessarily comprises forming the layers, bending the sheets and lastly assembling these various elements.

The roofs of vehicles in general have curvatures that are relatively unaccentuated except possibly those of the edges of these glazing units. The shaping of mineral glass sheets comprises, at least for one of them, processing that requires exposure to a high temperature (650-700° C.) that causes the glass to soften. The diodes and certain elements that are associated therewith are unable to withstand the temperatures in question. The diodes must therefore necessarily be inserted into the glazing unit after it has been bent. Their integration remains subject to the assembly of the glass sheets with the thermoplastic interlayer sheets.

The conditions of insertion of the diodes must take into account their relative vulnerability both to high temperatures and to mechanical stresses. The sheets are normally assembled in an autoclave at a temperature of about 120-130° C. and under pressure.

The nature of the diodes normally allows the temperatures in question to be withstood provided that they are not applied for very long periods and/or under aggressive chemical environmental conditions. Nevertheless, the temperature in question requires a few precautions to be taken as regards the choice of the materials used to form the connection between the diodes and their power supply circuit. This connection is sensitive to heat especially when it is formed by means of conductive adhesives. Using solders allows, if needs be, higher temperatures to be withstood.

The mechanical stresses are mainly a result of the pressures resulting from the assembly. To minimize the effect of these pressures, it is necessary to arrange the diodes so that they insert into the material of the interlayers without excessive force.

A first condition is to ensure that the interlayer is thick enough to allow the diodes to be inserted.

Conventional diodes with their packaging are ordinarily less than 1.5 mm in height, and most often less than 1 mm or even less than 0.7 mm in height. The heights in question are perfectly compatible with the thickness of the conventional interlayers used. By way of indication, PVB sheets that are 0.76 mm and 0.38 mm in thickness are commercially available. Furthermore, it is conventional in these laminated glazing units to associate a plurality of interlayers as needs be. According to the invention, the thickness of the interlayers is therefore at least equal to the height of the diodes. As an additional precaution, the thickness of the interlayer intended to envelop the diodes is chosen to be larger than the height of the diodes, for example 1.5 times this height or more, whilst being no more than required in order not to increase the total thickness of the glazing unit unnecessarily.

The mechanical resistance of the diodes, and even more so of their connection to the power supply circuit, must allow them to be inserted into the material of the interlayers during the assembly. Conventional ceramic packaging is highly resistant. The interlayer material is customarily softened enough during the bake in the autoclave to allow the diodes to be inserted simply by applying pressure.

The process described above may be replaced by a more unusual one in which the interlayer is formed from a material applied in fluid form at room temperature before being set, for example by cross linking, once the various elements have been put in place.

The power supply circuit of the diodes may be formed in various ways. One of them consists in using thin wires, which are advantageously inserted into the interlayer with the diodes as described in EP 1 979 160. The presence of these very thin wires is practically imperceptible if the glazing units have, systematically, a low light transmission. The main difficulty with this embodiment is with locating the diodes in the interlayer.

It is preferable, according to the invention, to arrange the power supply circuit and the diodes on a carrier that is distinct from the interlayers. It may be a question of one of the glass sheets of the laminate, provided that this sheet does not need to undergo a heat treatment of the type used for bending. One way forward consists, for example, in bending a sheet coated with a conductive layer. In this layer, the power supply circuit is formed before or after the bending has been carried out. Once the sheet has been bent, the diodes are arranged in appropriate locations on the power supply circuit. However, fitting diodes to a curved substrate is an operation that remains difficult to automate.

One alternative consists in forming a laminated glazing unit by associating a relatively thick curved sheet with a thinner planar sheet that is mechanically forced to follow closely the curvature of the thick sheet. It is envisioned to implement this technique only if the required curvatures remain relatively modest on account of the stresses that are able to be withstood, especially by the glass sheets. This type of assembly is for example such as described in patent application BE 2011/0415 (filed 4, Jul. 2011) or even in patent application BE 2012/0036 (filed 16, Feb. 2012). In the case of this type of assembly, the power supply circuit and the diodes are arranged on the planar sheet and the temperature increase to which they are exposed is only that of the bake in the autoclave.

In this assembly mode, the planar glass sheet is advantageously a chemically tempered glass sheet.

In a laminate assembled in the way described above, it is possible to place the planar sheet either toward the exterior or toward the interior. To minimize the risks associated with the impact of bits of stone, it may be preferable to place the sheet bearing the circuit and the diodes, which is presumably thinner, toward the interior. The fact that in this position the face of the sheet bearing the diodes and the power supply circuit is on the convex side generates tensile stresses. This does not cause any particular difficulties because the curvatures remain low and the stresses limited. Nevertheless, one particularity is a result of the type of diode used. Specifically, it is necessary to direct the light flux away from the side corresponding to the carrier of the diodes i.e. the glass sheet. In this case, the diodes used are necessarily "reverse gullwing" diodes.

In the assembly mode described above, the conductive layer in which the power supply circuit is formed is formed on the thin sheet. It is not easy to apply the layers when the glass sheets in question are very small in thickness (for example 0.8 mm or even about 0.4 mm in thickness). The techniques conventionally used to form these layers induce defects, especially because of the difficulty had controlling the planarity of the sheets at the stage of application of the layers.

Given the difficulty of handling relatively thin sheets of large size, on which the diodes are fixed beforehand, it is possible to proceed in a different way. It is a question of inserting, into the laminate, an element independent from the actual glass sheets and interlayers. In this mode the circuit and the diodes are arranged on a thin carrier element that is inserted into the laminate. This carrier element may be relatively small in size relative to the area of the roof. The size of the carrier element is advantageously limited to that required to place the diodes appropriately. For a reading light for example the area of the carrier may be limited to a few square decimeters or less.

The carrier is advantageously formed by a flexible polymer sheet. The resistance to deformation of the sheet in question is advantageously high enough to maintain the orientation of the diodes during their insertion into the interlayer material. The sheet may be composed of a number of superposed layers. It may especially comprise a sheet of polyethylene glycol terephthalate (PET) or similar serving as a carrier for the conductive circuit. Sheets of this type coated with a system of conductive layers are commercially available. With these polymer elements, the diodes can be fixed in place only without a notable increase in temperature because of the vulnerability of the material in question. The diodes are for example fixed in place by means of a conductive adhesive. PET sheets are very resistant to stretching, but are very flexible. They are therefore advantageously associated with a sheet made of a material that is less easily deformed flexurally in order to make it easier to position the diodes correctly.

The carrier element holding the circuit and the diodes may also advantageously be formed from a thin glass strip. On account of its size, which may be limited, the strip may be particularly thin, for example about 0.1 mm in thickness. Sheets of such small thickness have the advantage of being easily deformable to match the curvatures of the laminated roof. To improve their flexural strength these sheets, as in the preceding case, are advantageously chemically tempered. Moreover, elements made of glass are able to withstand temperatures that are compatible with the use of a solder to fasten the diodes to the circuit.

The inserted carriers of which it is a question above are essentially transparent materials. They do not modify substantially the light transmission properties of the roof. Because of the modest size of these carriers, and assuming that non-transparent portions are acceptable, it is possible to use materials conventionally used in printed circuit boards (PCBs), these products having the advantage of being very inexpensive.

Insertion of the diode carrier will preferably be facilitated by producing a lodging in the one or more interlayer sheets. This mode is conventionally used to insert various elements, especially photovoltaic cells, into laminated glazing units and even into roofs (as in EP 1 171 294). It is also a mode proposed in WO 2005/102688 for SPD-type assemblies intended to be used to vary light transmission.

The composition of the power supply circuits must satisfy a number of requirements. Firstly if, as is preferred in order to make the transparency as uniform as possible, a diode carrier that is transparent is used, the power supply circuit will itself preferably be such that it does not substantially modify the light transmission, or, more precisely, such that its presence remains practically indiscernible visually. In this case, the circuit for example consists of an essentially transparent conductive coating. However, very thin wires may also be used.

The type of thin conductive layers called TCOs (thin conductive oxides) or systems comprising at least one metal layer will advantageously be used for the transparent circuits. These conductive layers are very thin and are used in many fields, in particular that of photovoltaic cells. The conductivity of such oxide layers is lower than that of metal layers, which normally means they must be substantially larger in thickness. In any case, even for thicknesses of several tens of nanometers, the limited influence on the light transmission is not a problem on account of the fact that the overall transmission of the glazing unit itself is very low.

The choice of the conductive layers must also take their electrical properties into account. Conductive oxide layers ordinarily have relatively low conductivities, or in other words non-negligible resistances. Conductive oxide layers for example have a resistance of about $10\Omega/\square$ or more. Systems comprising metal layers have lower resistances, of about 1 to $5\Omega/\square$, but have a certain fragility and hence, despite their qualities, conductive oxide layers are still preferred.

In practice, it is important for the resistivity of the layer to be kept at a low enough level to prevent excessive Joule heating. As for the diodes, additional heating, which increases proportionally to resistance, must be avoided even if it means distributing the heat generated over the entire area occupied by the conductive layer.

The electrical circuit used to supply power to the diodes is formed in the conductive layer in a conventional way. For a carrier consisting of a thin glass strip, a conventional mode consists, for example, in patterning the layer that beforehand uniformly covers the carrier. This patterning is advantageously carried out by laser ablation. For carriers consisting of thin films, such as those of PET, the circuit is preferably formed using a printing technique.

With conventional packaging the light flux emitted by the diodes forms a beam of large beam angle, which angle may be as large as 180° and is at least 120° depending on the package used. This particularity, when the diodes are uniformly distributed over the roof, befits well ambient or courtesy lighting.

If the light beam has a large beam angle, its intensity is not uniform in all directions. Its intensity is highest in the direction normal to the plane of the semiconductor of the diode, and decreases until the largest beam angle is reached. This distribution is described in greater detail below by way of an example and associated figure.

Even though the intensity is higher in one direction, which may be chosen by suitably locating the diodes in the roof, this intrinsic partial "directivity" may not be enough. It may be preferable to direct the flux so as to obtain a beam of small beam angle.

To decrease the beam angle of a light beam originating from one or more diodes, a convergent lens is advantageously formed facing them. If this lens is diode mounted, for it to remain effective in the laminate its refractive index must differ from that of the interlayer material in which it is inserted. The most commonplace products have an epoxy resin lens the refractive index of which does not differ substantially from that of conventional interlayer materials. In this situation, to obtain the required convergence, the lens is placed not on the diode but on the face of the glazing unit turned toward the passenger compartment i.e. in position 4. In principle, the lens in question may be formed by modifying the surface of the glass sheet itself and thus be an integral part thereof. Nevertheless, for reasons of cost of implementation, it is advantageous for the lens to take the form of an added part that is placed facing the diodes. The part in question is made of a transparent material that may be glass, but also, if needs be, a sufficiently transparent and resistant polymer.

Fresnel lenses are preferred in order to minimize protrusion of this added lens into the passenger compartment. With such a lens it is possible to choose the beam angle of the beam that corresponds best to the size of the zone that it is desired to illuminate. For reading lights, a beam angle of 15 to 40° allows the size of the illuminated zone to be adjusted to take account of the distance separating the source from this reading zone.

For fixed directional lighting, the lens is placed on the internal face of the glass sheet turned toward the passenger compartment and unmodifiably bonded to this face adhesively. It is also possible to envision an orientable beam the direction of which may be modified, for example via translation of the lens over the face of the glass sheet. Such a means requires a device to be present that necessarily adds to the protuberance at the surface of the sheet.

The light beam may be limited as indicated above by a sort of diaphragm associated for example with each diode. This way of proceeding, contrary to the optical device, allows only a limited fraction of the emitted flux to be delivered. It is also possible to combine use of a diaphragm and a lens such as indicated above.

Placing a glazed roof on a vehicle aims to achieve, in part at least, an objective that is equally aesthetic in nature as functional. For this reason, it is preferable for all the means associated with these roofs to contribute to the achievement of this objective. The presence of lighting means contained in the roof must necessarily be accompanied by a specific power supply and the controls of these means.

The diodes require a specific voltage. As indicated above, this voltage is about a few volts (most often 2 to 4 V). The power supply of the diodes must necessarily comprise means for adjusting the voltage that is used to power the other systems of the vehicle, these systems depending on whether it is a question of automobiles or large panel vans of about 12 to 14 V or about 48 V. Even if miniaturized the means for transforming the voltage cannot be fitted into the laminate of the glazing unit. With regard to the need to keep all the elements contributing to the function close together, the required transformer(s) may be placed in proximity to the glazing unit. Advantageously, the transformer is placed under the enamel zone that masks the edges of the glazing unit.

The lighting may be controlled by simple switches. In conventional lighting modes, the switches are located in immediate proximity to the lighting means in order to avoid the need for complex circuits and to make the actuating means easier to identify. Conventional switches do not meet the need for transparency, reason for the choice of glazed roofs.

The invention proposes to use means for controlling the diodes that are also essentially transparent. For this purpose, the invention proposes to use switches the operation of which is triggered by way of relays actuated by a pulse associated with an electrical quantity. Preferably the switch used is a capacitive switch. This mode allows the actual structure of the elements included in the roof with the diodes to be optimized.

By way of indication, the capacitive sensor may be a direct contact sensor. The sensitive element is for example a zone defined in the low-E layer located on the face turned toward the passenger compartment. Since the low-E layers are conductive, they may be used as a sensor to control the switch relay. The advantage of a direct contact sensor is that the capacitance variation induced by the contact may be relatively large so that the threshold at which the switch switches may be set high enough to prevent any risk of parasitic triggering.

The sensor may also be an indirect contact sensor. In this case, the sensor is located inside the glazing unit. Advantageously, the sensor is incorporated in the conductive layer in which the power supply circuit of the diodes is formed. This sensor for example consists of a defined zone independent of the power supply circuit of the diodes. The capacitance variation is then induced indirectly by an electric field variation induced by moving the hand toward the location of the electrode in the glazing unit. The fact that a glass sheet is interposed limits the induced variation and as a result the detection threshold is lowered possibly leading to an increased sensitivity to parasitic triggering.

It is especially recommended when setting the sensitivity level to ensure that the threshold at which the switch triggers is higher than that which corresponds, for example, to the presence of water on the exterior glass sheet. An interposed grounded conductive layer allows parasitic effects to be prevented. This conductive layer may itself be transparent.

It is preferable for the conductive circuits that supply power to the diodes to be barely perceptible or imperceptible in the roof. If the capacitive sensor is formed, as indicated above, in the conductive layer, the latter must also not be easily discernible. It is possible to make it easier for a user to locate this "switch" using tactile means. The presence of protruding optical means, especially such as a Fresnel lens, on the surface of the interior face of the roof is an example thereof, but a simple frosting may suffice. It is also possible for the location of the sensor to be indicated optically by a very low brightness diode that is permanently supplied with power once the ignition of the vehicle has been turned on, or analogously by keeping the reading light turned on but at a very low operating level.

Embodiments of the invention described above relate to the combination of lighting means in roofs formed from glass sheets that allow certain light and energy transmission levels to be set. The glazing units according to the invention may comprise means that allow these transmissions and above all the light transmission to be varied at will. As indicated above, electrochromic devices may especially be the means used for this purpose. These means are also preferably SPD systems.

Roofs the light transmission of which is modified by way of an SPD are particularly advantageous because of their very rapid response to control signals. The variation in the light transmission obtained with these SPDs between the two "clear" and "dark" states depends on the systems chosen. In conventional products of this type, the variation in transmission between these two states may reach 40% or more, with, in the dark state, a transmission that may be extremely low. Moreover, the presence of these systems also leads to a very low energy transmission, independently of whether they are in their clear or dark state. This decrease in energy transmission is especially related to the measures taken to prevent the functional elements of these systems, i.e. the orientable particles, from being subjected to too great a temperature increase. It is also related to the fact that a significant portion of the energy accompanies wavelengths in the visible. Decreasing transmission in the visible automatically leads to a decrease in energy transmission.

Since SPD components are relatively vulnerable to exposure to heat, it is particularly important, insofar as the diodes will be located in immediate proximity, for their operation not to produce too great an increase in temperature. The aforementioned choice of the power and of the arrangement of the diodes a distance away from each other allows this condition to be satisfied.

When the diodes are located within the same perimeter as the SPD film, the diodes are located under this film, or in other words more toward the passenger compartment, such that a significant amount of the emitted light is not absorbed irrespectively of whether the film is in its "dark" or "clear" state.

The invention is described in detail with reference to examples that are illustrated by the mosaics, in which:

FIG. 1 schematically shows an exploded perspective view of a partial assembly of elements entering into the composition of a roof according to the invention;

FIG. 2 is a schematic cross-sectional view of a diode carrier;

FIG. 3 schematically shows a power supply circuit for 8 diodes;

Figure 6:
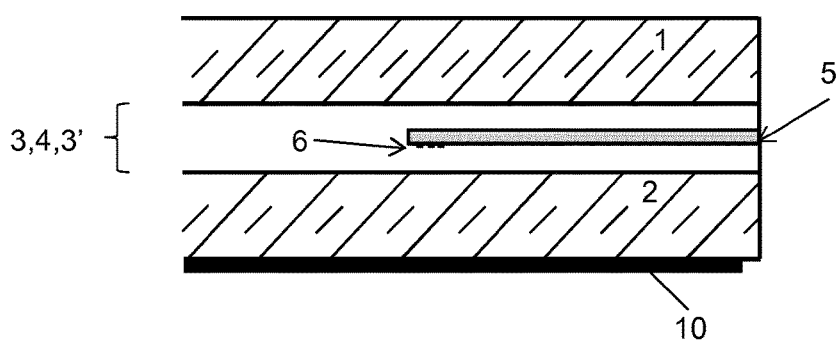
Figure 7:
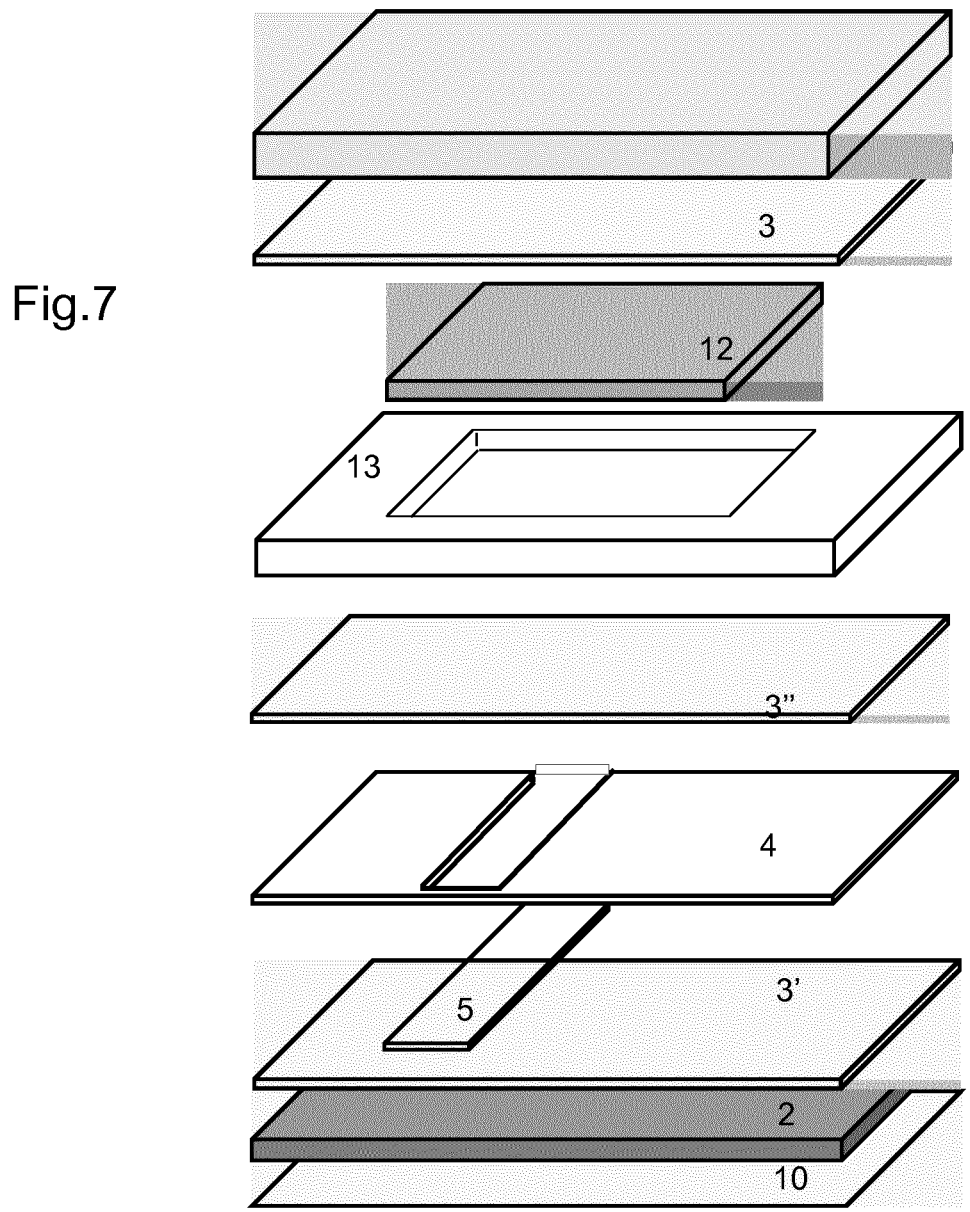
Figure 7A:
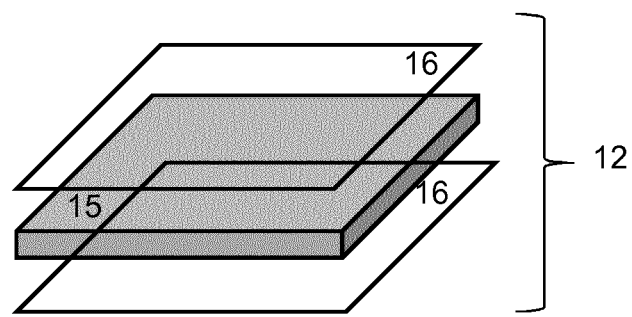
Figure 7B:
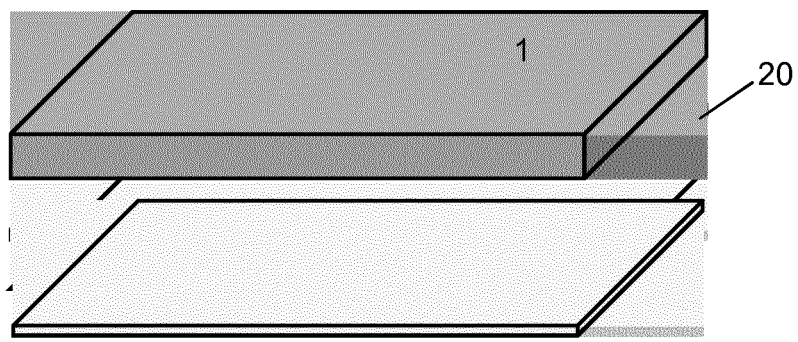

FIG. 6 schematically shows one embodiment in which the glazing unit comprises a system of low-E layers;

FIG. 7 shows an exploded perspective view of the elements of a glazing unit comprising an SPD assembly;

FIG. 7a shows a detail of the SPD film in FIG. 7;

FIG. 7b schematically shows elements for protecting an SPD assembly; and

FIG. 8 shows, on the CIE 1931 color space, the preferred perimeters of the colors of the illuminating light beam according to the invention.

The assembly of elements in FIG. 1 is one embodiment according to the invention. The elements are shown such as they are before they are assembled. In this figure the curvatures of the sheets are not reproduced for the sake of simplicity. In practice roofs, whether glazed or not, have curvatures that are ordinarily more accentuated at their edges in the place where they join with the body for a fit, chosen for its "design", aerodynamics and its "flush" appearance, corresponding to a good surface continuity between the contiguous elements.

In practice, glazing units occupy an increasing share of roofs, to the point of making up, in certain cases, almost all of these roofs. If needs be, on account of their size, these roofs comprise a plurality of juxtaposed panels in order to cover the largest possible area. In this case the various portions may be formed from glazing units having the same composition, in other words having the same functionality, but they may also be dedicated to separate functions. By way of indication, it is possible to find in a given roof a portion that comprises photovoltaic cells, and that is therefore essentially opaque to light transmission, and another portion that has the role of providing a certain light transmission.

The glazing unit in FIG. 1 comprises two glass sheets, an external glass sheet 1 and an internal glass sheet 2. Most frequently, these two glass sheets are made of highly absorbent colored glass, such that the light transmission is limited, for example to less than 50%, and in a configuration of this type preferably to less than 30%. The two sheets may have the same composition or not, but their combined color is such that a neutral color in transmission is obtained.

The glasses used for these sheets are for example gray glasses such as described in patent FR 2 738 238 or in patent EP 1 680 371, or the green-tinted gray glasses such as described in EP 887 320, or the blue-tinted glasses described as in EP 1 140 718.

In FIG. 1, the glass sheets are shown without the enamel patterns that are conventionally used to mask the edges of glazing units. Enamels of this type could for example be placed on the internal face of sheet 1, therefore in position 2, concealing all of the adhesive joints and localized connections at the edge of the glazing unit. The masking enamels may also be located in position 4, in other words on that face of the glazing unit which is exposed to the interior of the passenger compartment. However, in this position, for an observation from the exterior of the vehicle, they do not mask elements contained in the laminate. It is also possible to place the masks in position 2 and in position 4.

In the example shown, the carrier of the diodes 6 consists of a clear glass strip 5 (0.4 mm thick for example). The diodes 6 are soldered or adhesively bonded to the power supply circuit, which is formed in a conductive oxide layer (not shown). The diodes on the glass strip 5 are for example 0.6 mm in height.

PVB thermoplastic sheets 3 (0.38 mm in thickness), 3' (1.14 mm thick) and 4 (0.38 mm thick) complete the assembly. The sheets 3, 3' and 4 are also transparent. To make the strip 5 bearing the diodes easier to insert, the sheet 4 is of similar thickness to that of the strip 5 and comprises a cut-out corresponding to the size of this strip.

On assembly, the interlayer sheets baked in an autoclave under vacuum adhesively bond to one another and to the glass sheets. The vacuum allows air bubbles that could be trapped to be evacuated.

During the assembly process the interlayer material is softened enough for the diodes to penetrate into the sheet 3' without excessive pressure being required. The diodes fastened to the sheet 5 remain in the position they were in before they were assembled.

The glass sheets 1 and 2 are 2.1 mm and 2.1 mm in thickness, respectively. The assembled glazing unit has a total thickness of 6.1 mm.

The sheet 1 is made of a green glass the optical properties of which are, for a thickness of 4 mm and under illuminant A:

TL A4 27.3%; TE4 14.8%; $\lambda_D$ 486 nm; and P 18, (where $\lambda_D$ is the dominant wavelength and P is the excitation purity).

The sheet 2 is made of gray glass the properties of which are: TL A4 17%; TE4 15%; $\lambda_D$ 490 nm; and P 1.8.

The assembled glazing unit has the following optical properties:

TL A 19%; TE 12%; $\lambda_D$ 493 nm; P 8; and a color rendering index of 78.

FIG. 2 schematically shows in cross section the glass strip 5 to which a conductive layer 7 patterned so as to form the power supply circuit of the diodes 6 has been applied. The diodes are soldered to this layer. They are confined to a limited area in order to obtain a concentrated beam of sufficient power. The conductive circuit is formed so as to separate the supply poles, each diode being soldered to each of the two poles.

A schematic circuit is for example shown in FIG. 3. The strip 5, seen from above, comprises a conductive layer that is applied to most of the strip. The layer is divided in order to form the power supply circuit of the diodes, which have been referenced 6. The layer is made up of two symmetrical portions preserving a large area in order to dissipate, as much as possible, the heat produced in this layer by Joule heating. The areas of these conductors are also set so as to guarantee a practically identical supply current is delivered to each of the diodes. The arrangement of said diodes, which is a "parallel" arrangement along these conductors, may cause the currents flowing through these various diodes to differ. The configuration of the electrodes is chosen so as to minimize these differences and the delivered power. Each portion supplies 4 diodes with power and is itself divided into two (17 and 18), each portion corresponding to a supply pole (+, −). The diodes 6 are each connected to two poles.

To form the circuit the layer 7 initially extends uniformly over the entire surface of the glass sheet 5, the edges of the sheet 5 optionally not being coated. The various zones in this layer are separated by lines 21 scribed in this layer for example by ablation by means of a laser using well-known prior-art methods. The width of the ablation is limited to the width necessary to guarantee that the zones are electrically well insulated from one another.

The diodes are distributed in order to distribute as best as possible the heat produced during operation. The diodes are spaced apart from each other, but by a distance limited by the need to confine the resulting luminous emission. In the example, the diodes are arranged in a circle of 6 cm diameter.

By way of example, the conductive layer is a layer of indium tin oxide (ITO) with a resistance of 10Ω/□. An ITO layer is advantageous, especially because of its color neutrality. In particular it has substantially no effect on the appearance in transmission.

FIG. 3 also shows an electrode 19 cut into the conductive layer, just like the power supply circuit of the diodes. This electrode is connected to an assembly controlling the switch of the diodes in a circuit of the capacitance variation type. The charging time of the electrode depends on its capacitance, which itself varies depending on conductive elements placed nearby and that modify the electromagnetic field. The movement of the operator in this direction thus triggers a switch relay of the diodes. If needs be, the circuit may as known also comprise a dimmer allowing different power levels to be supplied for lighting of various brightnesses, each pulse changing the brightness from one level to another.

To limit parasitic triggering, the area of the conductor 20 connecting the electrode 19 to the device (not shown) is as small as possible. Likewise, if the sensitivity of the electrode 19 is such that especially the presence of water on the roof is detected as a lighting command, a conductive screen connected to ground is advantageously interposed between this electrode and the exterior of the roof. This screen may take the form of a thin conductive layer. This thin layer may for example cover the other face of the strip 5. Optionally, the electrode 19 and the conductor 20 that connects said electrode 19 to the switching device may be encircled by a conductive zone also cut into the layer and connected to ground, in order thus to decrease the possible incidence of neighboring electric fields.

The conditions to be met for a reading light are for example to place a given sufficient illumination on a surface and at a set distance. In one example, the distance is 0.6 m between the roof and the surface to be illuminated, which is a circle of 0.25 m radius. The minimum illumination required on this surface is for example 55 lux.

In the example in question, the diodes used are NS2W150A diodes from Nichia. It is a question of diodes of average power producing a "cold white" light. They are supplied with power at a voltage of 3.2 V and each draws a current of 0.100 A.

The light intensity given by the manufacturer is 17.4 cd for a current of 0.150 A. In the range in question, light intensity may be estimated to be roughly proportional to current. This light intensity, normal to the diode, is therefore about 11.6 cd. It varies as a function of direction in the way shown in the graph in FIG. 4. Thus, without optical means modifying the direction of the light flux, for an angle of 23° on either side of the normal, which corresponds approximately to the illuminated zone desired under the conditions indicated above, the light intensity emitted by a diode is about 10.45 cd. The incidence of the insertion of the diodes into the laminate, and especially reflections and light absorption on the path of the beam, is accounted for. Finally, to achieve the necessary illumination, about 8 diodes of this type are required to form a reading light.

Use of a plurality of diodes of limited power, apart from controlling local heating, also decreases the dazzle that may result from direct observation of the diodes. This effect may be further minimized by promoting a certain amount of scattering of the light beam, for example by frosting the internal sheet in the location corresponding to the diodes.

The light flux emitted by the diodes is characterized by the color coordinates shown in the graph in FIG. 8 and represented by the limits designated by the overall reference N. The range such as offered by the manufacturer is subdivided into portions corresponding to distinct classes left to the choice of the user. The manufacturer proposes, if needs be, to select the diodes beforehand so that they are all located in just one of these portions. This selection, which allows the color to be narrowed, has an additional cost associated. The same graph shows the perimeter P corresponding to the preferred color according to the invention. It will be noted that this color, which covers to a large extent that of the diodes, also takes into account the incidence of the glass sheet that is interposed between the diodes and the passenger compartment, and optionally that of the interlayer if the latter is colored.

In the preceding example, the diodes emit a flux of slightly bluish white light that is qualified "cold". If a "warm" light is preferred, a product of the same type may be chosen, such as the Nichia product referenced NS2L 150A. The spectrum of these diodes corresponds to the perimeter designated M.

As indicated above, more powerful diodes will optionally be used, but apart from the additional cost, they have the drawback of a lower longevity.

Placing the 8 diodes in the laminate does not result in destructive heating. For continuous operation in an immobile atmosphere at an ambient temperature of 25° C., the glazing unit being placed in a substantially horizontal position, the temperature increases to about 35° C. These temperatures degrade neither the diodes nor the components of the glazing unit.

Figure 4:
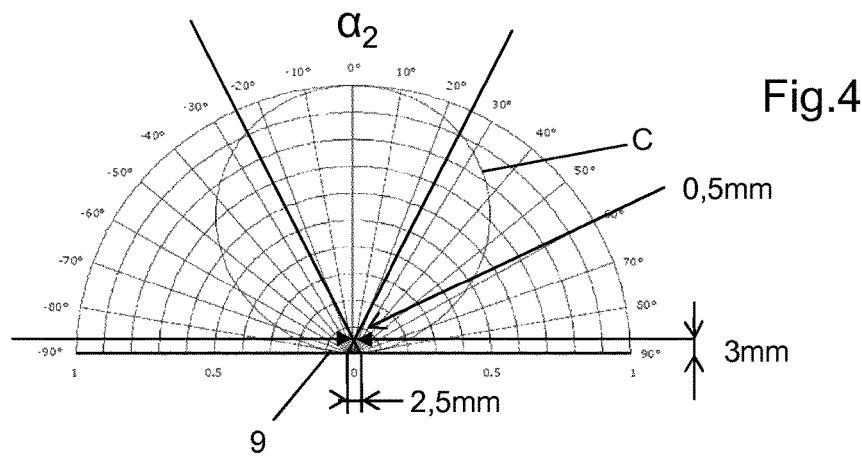
FIG. 4 is a schematic illustrating the light intensity distribution of a beam emitted by a diode.

Without concentrating means, the light flux emitted by the chosen diodes is distributed in the way shown in the graph in FIG. 4. In this graph the light intensity scale is on the horizontal axis. The concentric semi-circles represent fractions of intensity, from 0 to 100%, of the greatest intensity, which is located vertically. The intensity is read from the graph at the point where the straight line corresponding to the direction intersects the circle C. The light intensity rapidly decreases as the angle is increased relative to the normal to the source. It is no longer more than about half for an angle of 60°. This distribution may be satisfactory if, outside of the area that it is desired to illuminate, a certain luminosity is not bothersome. Assuming the opposite is true, it is recommended to restrict the light beam.

Figure 5:
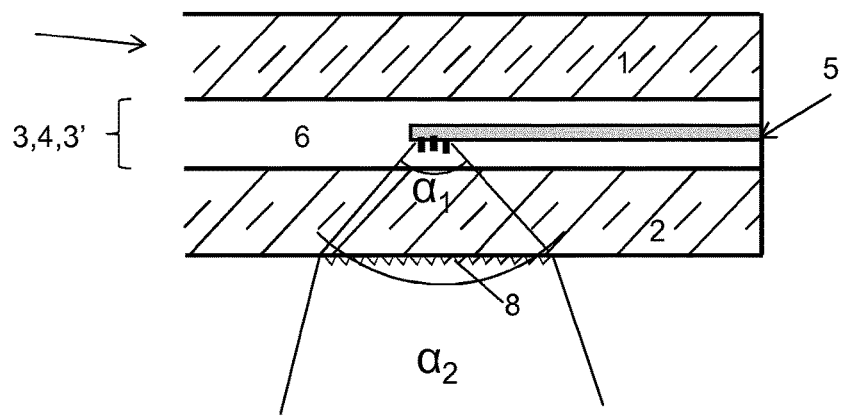
FIG. 5 shows one way of controlling the light beam.

FIG. 5 schematically shows in cross section, one side of a roof glazing unit comprising a set of diodes 6 on a carrier 5 formed by a glass strip. The set of diodes 6 and their carrier 5 is incorporated as above in a plurality of plastic interlayers (3, 4, 3').

FIG. 5 illustrates the fact that the light flux emitted by the diodes 6 is distributed into a beam of large beam angle. With no other device than the reflector that forms part of the packaging of the diode, the initial flux is developed over an angle at the origin, in other words in the interlayer and in the sheet 2, which may be as large as 180° and is not ordinarily smaller than 120°, depending on the configuration of the packaging of the diode. This is represented by the angle $\alpha_1$.

When it is desired to limit the beam, additional measures are required. FIG. 5 schematically illustrates the use of a Fresnel lens 8 on the face 4 of the glazing unit facing the diodes. In this way, the beam angle is decreased to $\alpha_2$.

Another mode capable of producing a beam of smaller beam angle consists in using a diaphragm to limit the flux to the portion directed in the desired direction. The diaphragm may consist of an opaque enamel pattern 9 applied to the face of glass sheet 2 turned toward the passenger compartment. This arrangement must be applied to each diode individually. It is therefore necessary for the respective positions of the diodes and the apertures in the opaque enamel layer to be rigorously established.

The graph in FIG. 4 illustrates the effect of one example of this way of limiting the beam with a diaphragm. The diaphragm is represented by two arrows defining the aperture. The enamel 9 is placed 3 mm from the source, which is the same size as a diode i.e. about 2.5 mm in size. The enamel-free aperture is 0.5 mm. In this configuration, the beam angle is 48°.

FIG. 6 schematically illustrates the use of a system of low-E layers 10 applied in position 4. In this position, the layers are not protected from mechanical or chemical attack originating from the passenger compartment. This arrangement is nevertheless necessary to achieve the required efficacy. Oxide-based layers obtained by pyrolysis have a good mechanical resistance.

The most commonplace pyrolytic low-E (low emissivity) systems comprise a layer of doped tin oxide deposited on a first layer having the role of neutralizing color in reflection. The layer making contact with the glass is ordinarily a layer of silica or silicon oxycarbide, optionally modified by additives. Tin oxide layers, compared to the layers of systems deposited by cathode sputtering, are relatively thick, i.e. more than 200 nm and in certain cases more than 450 nm in thickness. These thick layers are sufficiently resistant to withstand exposure to mechanical and/or chemical attack.

One example low-E system having the desired properties consists of a 470 nm-thick layer of tin oxide doped with 2 at % fluorine. This layer is deposited on a layer making contact with the glass, said layer being 75 nm-thick and composed of silicon oxycarbide. This system, on a 4 mm-thick clear glass sheet, leads to an emissivity of about 0.1.

Other systems of low-E layers may be produced using a cathode sputtering technique while preserving a satisfactory mechanical resistance. Systems of this type are for example composed of oxides, especially layers based on titanium oxide in association with other metal oxides, especially zirconium oxide. Layers of this type are in particular described in patent application WO 2010/031808.

By way of yet another example, a usable system comprises a layer of an alloy of chromium and zirconium. To protect this metal layer deposited by cathode sputtering, it is sandwiched between two layers of silicon nitride. This assembly leads to a satisfactory emissivity with a decrease in the light transmission that may reach 10%, decrease that for the use in question does not constitute a drawback.

The use of these low-E systems considerably improves how comfortable the passenger compartment feels during cold periods and may make the use of a screen superfluous.

Glazed roofs according to the invention may advantageously combine a plurality of functionalities. Among the latter, it is advantageous to use the glazed roof for lighting, as explained above, but also to provide means allowing the light transmission of the roof to be controllably varied, whether this variation occurs simultaneously or not.

The use of a functional SPD film is the subject of prior-art publications and especially WO 2005/102688, which specifies certain operating conditions that are recalled below with regard to the figures.

In principle, the application of SPD cells to automotive roofs the light transmission of which can be controlled is well known. Use of these films allows transmission to be very substantially modified between two separate states, a clear state and a dark state. One advantage of these systems is, in the dark state, that they almost completely suppress light transmission. Commercially available films decrease transmission in the visible to less than 1%. This is the state that corresponds to the absence of electric field. Under these conditions, the glazing unit ensures the desired aspect of "privacy" in a particularly effective way. The variation in visible light transmission may be as high as 40% or more between the two states of the film. The choice of the films allows, if needs be, the magnitude of this variation to be set. Users prefer relatively substantial shifts, and generally the latter are no smaller than 30% in the envisioned applications.

Although the variation in light transmission is a key factor in the choice of the SPD films, the latter also play an important role in the energy transmission of the glazing units in which they are incorporated. In the dark state, the energy transmission, independently of the presence of absorbent glass sheets or interlayers, is ordinarily lower than 5%. The dark state is normally that of the vehicle when it is parked, a very limited energy transmission is therefore particularly welcome. In the clear state the energy transmission is substantially greater, because the visible radiation also transmits energy. Nevertheless, the SPD film absorbs a significant share of the energy.

The use of SPD films is subject to a few requirements other than those relating to their ability to modify light transmission. Firstly, it is recommended to protect the functional film mechanically and chemically.

FIG. 7 illustrates the composition of a roof providing both functionalities i.e. both a lighting functionality and a controllable light transmission functionality. As for the roof in FIG. 1, this roof also comprises two glass sheets 1 and 2, interlayers 3, 3' and 4 and a carrier strip 5 holding the diodes.

The SPD film 12 is schematically shown. It does not cover the glazing unit in its entirety. The edges of the SPD film must be protected from contact with the exterior atmosphere, in particular in order to protect the active particles from moisture. To prevent any contact with the atmosphere, the SPD film 12 is entirely enveloped in the various interlayer sheets. To envelop the film 12, an interlayer sheet 13 of similar thickness to that of the film is placed so as to encircle the film 12. A sheet 13 with a suitable cut allows the film to be encircled in order to isolate it from the exterior. FIG. 7 shows a sheet 13 of integral construction in which a hole has been produced. It is possible to replace this integral sheet with a set of juxtaposed bands encircling the film 12 in an equivalent way. The presence of this sheet 13 isolates the SPD film and simultaneously ensures the pressure exerted on the constituents of the glazing unit during its assembly is uniformly distributed.

The sheet 13 may or may not be of the same nature as the interlayers 3 and 4. The fusion of the various sheets during the assembly process is facilitated if the glass sheets are of the same nature.

Another requirement of SPD films is related to their sensitivity to heat. In SPD films, the particles, which are ordinarily incorporated into a polymer matrix, may be degraded by an excessive increase in temperature. To a lesser extent, the films may see their properties irreversibly modified if they are exposed to temperatures that are too low, −40° C. for example. Exposure to external temperature variations is accentuated by the position envisioned according to the invention. Solar radiation, and in particular infrared rays, may lead to a large temperature increase.

To prevent degradation of the film, provision is made, especially in the aforementioned text, to place an infrared filter above the SPD film.

It is also desirable to protect the SPD from the ultraviolet. The materials used to form the laminates and encapsulate the cells are ordinarily products that by themselves are UV screens. This is in particular the case for materials such as polyvinyl butyral (PVB) or polymers of ethylene vinyl acetate (EVA), described previously for producing the laminated structures of these roofs. The presence of such compounds form a practically complete UV filter. Therefore, it is not necessary to provide additional elements.

In FIG. 7, the functional elements present in the laminate are in relative positions that take their possible interdependence into account. By way of indication, the illuminating means formed by the light-emitting diodes are very obviously located under the film used to control light transmission, so that the light flux that they produce is independent of the variations in light absorption set by this film.

The film used to control light transmission and the lighting means are necessarily supplied with electrical power. They are necessarily connected to the general electrical power supply of the vehicle via the edges of the glazing unit. The connecting electrical cables are not normally transparent. In order not to interrupt the even limited transparency of the glazing unit, care is taken to conceal these cables in peripheral zones of the glazing unit, which normally comprise opaque enamel portions especially intended to mask the marks of irregular adhesive joints. These masks also conceal the limits of the SPD films 12 with their frame 13. FIG. 7 does not show these enamel bands.

The structure of the SPD-type films described in patent application WO 2005/102688 is schematically shown in FIG. 7a. This structure comprises a central element 15 consisting of a polymer containing particles sensitive to the application of an electric field. On either side of this central element 15, and extending over each of the faces of the latter, two electrodes 16 allow the voltage required to control the element 15 to be applied. As known, the electrodes 16 advantageously consist of essentially transparent sheets coated with thin conductive layers. Sheets of polyethylene glycol terephthalate (PET) of a few tens of microns in thickness, which combine a good transparency with a high mechanical resistance, are most often used. On these sheets, the conductive layers are advantageously TCO (thin conductive oxide) layers such as layers of ITO (indium tin oxide).

As indicated above, the components of SPD films, and especially the particles, which are organic in nature, are sensitive to aging, in particular under the effect of heat. To give them the desired longevity, the film is normally protected by filters interposed between the external glass sheet 1 exposed to solar radiation and the SPD film 15. Infrared filters are used in many applications, in solar-control glazing units or in low-E glazing units. They generally consist of thin conductive oxide films, or better still as they perform much better, metal layers that are thin enough to be practically transparent. In these filters, the metal layers are associated with dielectric layers that are also thin and transparent, which provide the assembly with the required selectivity. Most often, in order to improve this selectivity, which is accompanied by reflection that should be made as neutral as possible, the filters comprise a plurality of metal layers which are essentially based on silver.

The layers filtering the infrared are either applied to the external glass sheet or inserted by way of a polymer, especially PET, interlayer sheet. FIG. 7b shows a detail of an assembly of this type in which, under the external glass sheet 1, a sheet 14 bearing the infrared filter is placed between two interlayer sheets 3 and 20. Insofar as the PET carrier of the layers is not itself of a nature to adhere to the glass, it is necessary to insert it between two thermoplastic interlayer sheets. The use of a carrier film makes it possible not to subject the fragile layers to high temperatures. The only constraint remains the temperature of the autoclave bake of the assembly process. The downside is that an interlayer sheet must be added, thereby increasing the thickness of the assembly.

It is also possible to employ a system of layers deposited directly on the external glass sheet. However, as indicated, if very high-performance filters are chosen, such as those comprising metal layers, these layers are applied by cathodic sputtering techniques, which are carried out on planar sheets. Thus, this solution requires these layers to undergo heat treatments when this glass sheet is shaped.

The system of layers chosen is advantageously a system that contains a number of silver layers, in order to obtain an effective filter, and that allows color, especially in reflection, to be controlled. A particularly effective assembly of layers is described in patent application WO 2011/147875. In this application, the recommended system comprises three silver layers and dielectric layers, the assembly being chosen, especially the thicknesses of the silver layers, such that the color in reflection is satisfactory even at low incidences of observation.

The protection of the SPD film must also take into account the presence of diodes when the latter are placed on portions of the surface of the roof that are covered by this film. The example given above shows that, by suitably choosing the diodes and their arrangement, it is possible to limit the local temperature increase related to operation of the diodes to a few tens of degrees. In any case, this increase remains smaller than that associated with exposure to solar radiation.

The invention claimed is:

1. A laminated glazed automotive vehicle roof, comprising:
   first and second glass sheets;
   interlayer material for laminating the first and second glass sheets together; and
   a set of light-emitting diodes and a power supply circuit incorporated between the glass sheets and the interlayer material of the laminate,
   wherein the roof has a light transmission TL of at most 50%, a number of diodes and their power being chosen to ensure useful illumination without occasioning prejudicial heating of the constituents of the glazing unit, the power supply circuit and the diodes are placed on a glass carrier inserted between the glass sheets of the laminate, and an area of the glass carrier is smaller than an area of both the first and second glass sheets.

2. The roof as claimed in claim 1, in which the electrical power of each diode does not exceed 2 W.

3. The roof as claimed in claim 1, in which the diodes chosen have an individual luminous efficacy no lower than 75 lm/W.

4. The roof as claimed in claim 1, in which the diodes, used to produce a reading light, lead to a total emission such that a light flux in a passenger compartment, issuing from the glazed roof, is no lower than 1 lm.

5. The roof as claimed in claim 1, wherein, to form a reading light, the roof has 2 to 20 diodes.

6. The roof as claimed in claim 1, in which a Fresnel lens is placed facing the diodes and on a face of the second glass sheet facing an interior of the vehicle, in order to limit a beam angle of a light flux.

7. The roof as claimed in claim 1, in which the diodes are a distance from each other that is no lower than 20 mm.

8. The roof as claimed in claim 1, in which the diodes and the elements located between these diodes and a passenger compartment on a path traced by light from the diodes are chosen such that a light flux has an essentially neutral spectrum.

9. The roof as claimed in claim 8, the spectrum of which is located in a perimeter defined by the points of CIE 1931 coordinates: (0.2600; 0.3450), (0.4000; 0.4000), (0.4500; 0.4000), (0.3150; 0.2900), (0.2350; 0.2500).

10. The roof as claimed in claim 1, further comprising on a face of the second glass sheet facing an interior of the vehicle a system of low-E layers, such that the roof has an emissivity of at most 0.3.

11. The roof as claimed in claim 1, in which the power supply circuit of the diodes is formed in a thin conductive TCO layer.

12. The roof as claimed in claim 1, further comprising a control for switching on/off the diodes with a capacitive type sensor incorporated in the roof.

13. The roof as claimed in claim 12, wherein the sensor is formed in a same layer used to form the power supply circuit of the diodes.

14. The roof as claimed in claim 12, further comprising a conductive film connected to ground interposed between the sensor and an external sheet in order to protect from parasitic influences.

15. The roof as claimed in claim 5, having 4 to 15 diodes.

16. The roof as claimed in claim 8, wherein the roof has a spectrum located in a perimeter defined by the points of CIE 1931 coordinates: (0.2650; 0. 3350), (0.3200; 0.3200), (0.3100; 0.3000), (0.2350; 0.2500).

17. The roof as claimed in claim 1, in which the diodes, used to produce a reading light, lead to a total emission such that a light flux in a passenger compartment, issuing from the glazed roof, is no lower than 2lm.

18. The roof as claimed in claim 1, in which an electrical power of each diode does not exceed 1 W.

19. The roof as claimed in claim 1, wherein the glass carrier has an area of a few square decimeters.

20. The roof as claimed in claim 1, wherein the glass carrier is surrounded on three side edges by the interlayer.

21. A laminated glazed automotive vehicle roof, comprising:

first and second glass sheets;

interlayer material; and a set of light-emitting diodes and a power supply circuit incorporated between the glass sheets and the interlayer material of the laminate, wherein the roof has a light transmission TL of at most 50%, the power supply circuit and the diodes are located on a glass carrier inserted between the glass sheets of the laminate, and an area of the glass carrier is smaller than an area of both the first and second glass sheets and smaller than an area of the interlayer material.

22. A laminated glazed automotive vehicle roof, comprising:

first and second glass sheets;

interlayer material between the first and second glass sheets, the interlayer material having a cut-out; and a set of light-emitting diodes and a power supply circuit incorporated between the glass sheets and the interlayer material of the laminate, wherein the power supply circuit and the diodes are located on a glass carrier inserted between the glass sheets of the laminate, wherein a size of the glass carrier corresponds to a size of the cut-out in the interlayer material, and wherein the roof has a light transmission TL of at most 50%.

* * * * *